Feb. 15, 1966  B. A. FULTON  3,235,046
ONE-WAY CLUTCH
Filed April 19, 1963  3 Sheets-Sheet 1

INVENTOR.
Bertram A. Fulton
BY
Attorney

Feb. 15, 1966     B. A. FULTON     3,235,046
ONE-WAY CLUTCH

Filed April 19, 1963     3 Sheets-Sheet 2

*INVENTOR.*
Bertram A. Fulton
BY
*Attorney*

Feb. 15, 1966  B. A. FULTON  3,235,046
ONE-WAY CLUTCH
Filed April 19, 1963  3 Sheets-Sheet 3

INVENTOR.
Bertram A. Fulton
BY
Attorney

United States Patent Office 3,235,046
Patented Feb. 15, 1966

3,235,046
ONE-WAY CLUTCH
Bertram A. Fulton, Lynnfield, Mass., assignor to Arthur D. Little, Inc., Cambridge, Mass., a corporation of Massachusetts
Filed Apr. 19, 1963, Ser. No. 274,228
3 Claims. (Cl. 192—45.1)

This application is a continuation-in-part of my co-pending application Serial No. 130,276, filed Aug. 9, 1961, now U.S. Patent 3,107,764.

This invention relates to one-way clutches and more particularly to one-way clutches with friction wedge grippers.

So-called one-way clutches are now extensively used in automatic transmissions in automobiles, in many household appliances, and in aircraft construction, as well as in a number of other mechanical devices where it is necessary to be able to transmit power in one relative direction only.

Clutches of this type are attractive because it should be possible to transmit loads across relatively large areas, and stresses could be made low in contrast to two point gripper types, for example, where loads are transmitted through line or point contacts. However, such clutches have previously been difficult to assemble due to the handling of an excessively large number of parts; they have not been capable of functioning as bearings during overrunning; and they have been relatively expensive to make.

The one-way clutches now most commonly in use may be one of three types: the cam and roller type, the sprag type, or the helical spring type. Although with long and intensive development these clutches have been made relatively satisfactory, they are comparatively expensive to manufacture and they possess certain inherent disadvantages. Among these disadvantages are, first, loads are transmitted through a line contact between a fairly small diameter roller or sprag and a race, resulting in very high local stresses. This then requires the use of premium steels which are carefully heat treated to withstand these conditions of operation. Second, extreme accuracy is required in the forming of the various pieces and this accuracy is difficult to obtain and increases the cost of the clutch. Finally, in the clutches of the prior art, wear occurs at the line contacts between the sprag and the race, or the cam and the roller, and this wear tends to quickly destroy the required accuracy in the clutch's operation.

It would be desirable to have a clutch of the character described, where the wear is distributed over large areas, that can be made economically and is not subject to reducing the accuracy of the parts during operation.

It is therefore an object of this invention to provide a one-way clutch in which loads are transmitted through areas in contact, thus eleminating high localized stresses. It is another object to provide a clutch of the character described, in the manufacture of which it is possible to use production techniques which can economically produce the accuracy required. It is another object to provide a one-way clutch of a novel design in which the wear actually improves the conformity between the race and the gripper and which will engage at low temperatures. Another object is to provide such a clutch which requires less torsional windup in loading and in which, therefore, less energy is stored. It is another object to provide a one-way clutch which eliminates a problem associated with other clutches; namely, the fact that axial motion between the races may occur during the time the clutch is beginning to lock up and to interfere with locking up. It is yet another object to provide a clutch of the character described which is capable of coping with occasionally very high overloads and which contains grippers capable of acting as their own bearings. These and other objects will become obvious in the following description.

The one-way clutch of this invention, which achieves these objects, can be generally described as comprising an inner race and an outer race in axial alignment defining a space therebetween, gripper means located and movable within the space and engaging means adapted to maintain the gripper means in contact with the races. The races have facing, concentric circular surfaces which are each in contact with a surface of the gripper means. The gripper means, which are preferably a plurality of members, have circular surfaces designed to mate in area-to-area contact with substantially all of the circular facing surfaces of the inner and outer races. Each gripper member comprises two separate, generally wedge-shaped pieces in area-to-area contact, and these contacting surfaces of the gripper members are adapted to slide on each other. The geometry of the gripper pieces making up one gripper member is such that when the pieces slide on each other in one relative direction, the circular surfaces of the gripper pieces spread further apart and thus press against the races and lock the inner and outer races into a fixed position with relation to each other.

The circular surfaces of the races and grippers are adapted to develop a higher frictional force than the sliding surfaces of the pieces making up the members of the gripper means. The attainment of a differential in frictional force is achieved through either construction or design. Construction of the clutch to achieve the requisite locking is accomplished by the use of materials, the surfaces of which have different coefficients of friction; while the design of the clutch to achieve this requisite locking embodies the use of grooved surfaces. Of course, a combination of construction and design may be used in the one-way clutch of this invention.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which FIG. 1 is an idealized sketch of a portion of the gripper and segments of the races showing the forces acting upon the various engaging surfaces;

Figure 1:
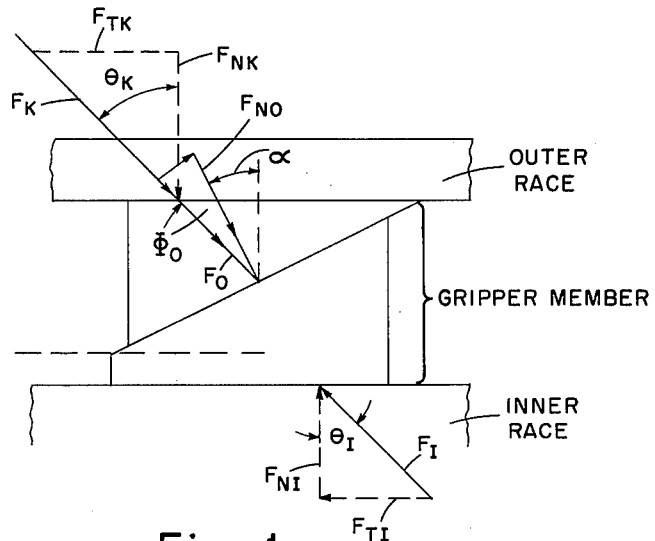
Figure 2:
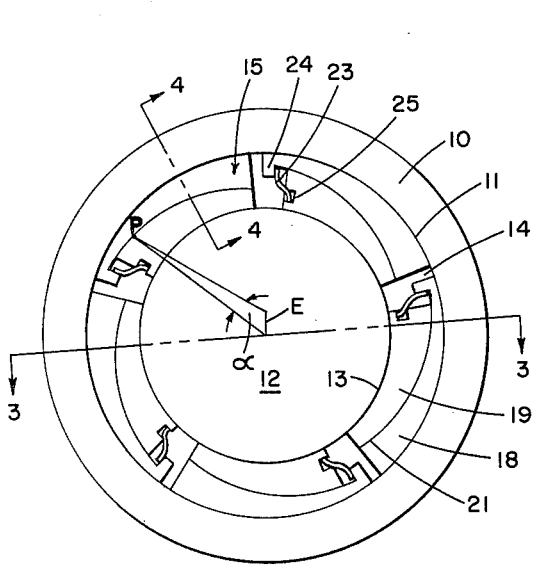
FIG. 2 is a top plan view, of a one-way clutch constructed in accordance with this invention.
Figure 3:
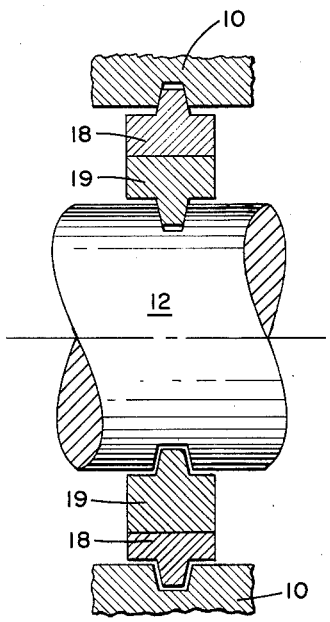
FIG. 3 is a side view, partially in cross-section along line 3—3 of the clutch of FIG. 2.
Figure 4:
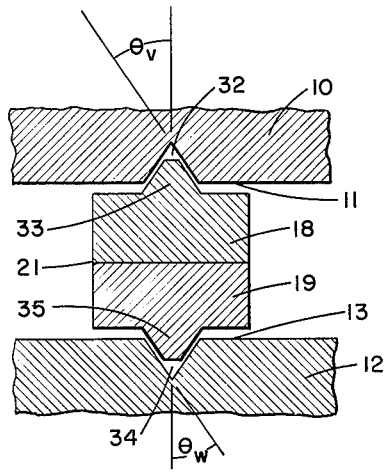
FIG. 4 is a cross-sectional detail view along line 4—4 of FIG. 2, further illustrating the forces involved when the required frictional force is developed through design.
Figure 5:
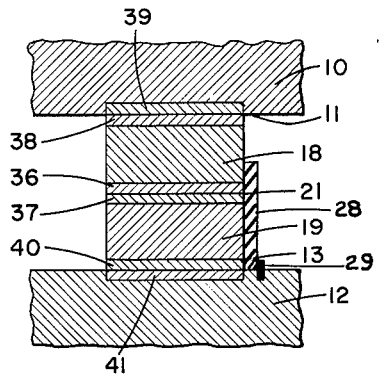
FIG. 5 is a cross-sectional detail view along line 4—4 of FIG. 2 illustrating the use of engaging surfaces having different coefficients of friction.

In the drawings, FIGS. 1 and 4 are directed to the presentation of theory, FIGS. 2 and 3 to overall construction features, FIG. 5 to a modification of the one-way clutch of this invention which achieves the desired locking through construction, that is, through use of surfaces having different coefficients of friction, and FIGS. 6–12 to modifications in the engaging surfaces in which design of the surfaces is used primarily to develop the differential friction forces required.

Turning now to FIG. 1, it will be helpful to examine briefly the theory concerned with a one-way clutch constructed in accordance with this invention, for through such an examination it is possible to illustrate the relationship between the coefficients of friction and the contour of the surfaces involved in the functioning of such a clutch which I have found necessary for satisfactory operation to attain the above-stated objects through construction and design.

In FIG. 1 there is shown a gripper member and a segment of the outer and inner races of an infinitely large diameter clutch. Using this clutch of infinite diameter simplifies the following theory and mathematical derivations.

In FIG. 1, $F_I$ is the resultant force on the gripper at the inner race and $F_O$ the resultant at the sliding surface between the gripper pieces. If the gripper is to be at equilibrium then $F_I$ and $F_O$ must be equal and colinear, $$\therefore \alpha + \arctan \frac{F_{TO}}{F_{NO}} = \theta_I \quad (1)$$

or $$\alpha + \phi_O = \theta_I$$

In order to develop a load the gripper pieces must slide relative to each other and therefore $$\frac{F_{TO}}{F_{NO}} = \mu_O \text{ the static friction coefficient at the sliding surface} \quad (2)$$

Define $\phi_O$ arctan $\mu_O =$ friction angle $\quad (3)$ $$\therefore \phi_O = \arctan \frac{F_{TO}}{F_{NO}} \quad (4)$$

In order to transmit torque the inner race must not slip so that $$\frac{F_{TI}}{F_{NI}} < \mu_I \quad (5)$$

or $$\phi_I = \arctan \frac{F_{TI}}{F_{NI}} < \phi_I \quad (6)$$

Substituting (6) and (4) in (1)

$$\alpha + \phi_O < \phi_I \quad (7)$$

where $\phi_I$ is the friction angle at the inner race.

A similar analysis of forces on the upper piece of the gripper means which is in surface contact with the outer race results in $$\alpha + \phi_O < \phi_K \quad (8)$$

where $\phi_K$ is the friction angle at the outer race.

The above mathematical analysis of a one-way clutch having circular outer and inner races and gripper pieces as shown illustrates the relationship which must exist between the engaging surfaces of the various elements in the clutch. The adherence to these relationships in the clutch of this invention will be pointed out below in the description of the various modifications of the clutch.

Turning now to FIGS. 2 and 3 there are shown two views of a typical embodiment of the one-way clutch of this invention. FIG. 2 is a top plan and FIG. 3 is a side view partially in cross-section of one modification of the one-way clutch of FIG. 2.

In FIG. 2, the one-way clutch is seen to have an outer race 10 which has a circular inner surface 11, and an inner race 12 which has a circular outer surface 13. The outer and inner races define between them a space 14 which is substantially all occupied by gripper means, one member of which is generally indicated at 15. Each of the grippers is formed of two pieces 18 and 19 which are in area-to-area contact along their common contoured surfaces 21. In the one-way clutch of FIG. 2, surfaces 11 and 13 are the gripping surfaces, and the gripper pieces 18 and 19 are circular to correspond to the circular surfaces 11 and 12. Surface 21 between the gripper pieces 18 and 19 is a sliding surface.

The gripper means are aligned and kept in engagement by engaging means 23 which in FIG. 2 are shown to be springs. In the embodiment of FIG. 2, the springs 23 function by pressing against an extension 24 of gripper piece 18 and are held in place on gripper piece 19 through clip 25. Any engaging means adapted to maintain the grippers in contact with the races and in alignment are suitable for the one-way clutch of this invention.

The operation of the clutch may be described with reference to FIG. 2. Assume in this illustration that the inner race 12 is driving the outer race 10, a situation which can of course be reversed. Engagement under these assumed conditions is achieved when the inner race is rotated in a clockwise direction; disengagement when the inner race is rotated in a counterclockwise direction.

As the inner race begins to drive the outer race there is frictional engagement between the races and their corresponding wedge surfaces. Because of the relatively higher friction force at the races, the wedges move clockwise with the inner race and slide on the sliding surface 21, between the gripper pieces. As the wedge slides on the sliding surface, it is forced radially inward against both races and thus radial force increases. The sliding surface is so designed that the radial force developed is great enough to allow the gripper to transmit more frictional force from the inner race without slipping. This frictional force is directly related to driving torque and thus, as this torque increases or decreases, the gripper slides on the sliding surface and thus presses with greater or lesser radial force on the inner race to develop greater or lesser frictional force as required.

Disengagement is achieved, in this illustration, if the inner race is rotated in a counterclockwise direction. Under these conditions the wedges (gripper means) assume their original position in contact with the cam surface of the outer race and are held in position by the engaging means. The inner race is then free to rotate.

FIG. 3 illustrates another view of the clutch of FIG. 2, partially in cross-section. It shows the attainment of the required different frictional forces through the use of design which will be discussed below.

As will be seen in FIG. 2, the gripper means occupies substantially all of the space defined between the races, that is, they occupy the entire space except for such part of it as is required for the engaging means and the required restricted movement of the grippers. It will further be observed that substantially all of the circular area of the gripper means is in contact with the circular surface areas of the inner and outer races, and that the contoured areas between the gripper members encompasses substantially the entire space of that portion of each of the gripper members which serves as the sliding surface.

Reverting now to the design of the grippers, which in FIG. 2 take the form of a plurality of gripper members, each formed of two gripper pieces, the clutch of that figure may be further described in connection with the theory given above. It will be seen from this theory that the degree of eccentricity defining the radius of the common surface between gripper pieces 18 and 19 may be related to the coefficients of friction between the sliding surface 21 and the gripping circular surfaces 11 and 13 between the gripper means and the outer and inner races. In FIG. 2, the $\alpha$ is shown, and it is defined as the angle formed by two lines joining any point on the surface 21 with the centers of the two circles defining the inner race and the surface 21 between the gripper means. It will be appreciated that the size of this angle varies slightly, depending upon the choice of the point P on the periphery of the gripper piece. However, as is pointed out above, the degree of eccentricity which may be represented between distance E between the centers of the two circles may be related to the coefficients of friction, in that the tangent of $\alpha$ must alwyas be less than the difference between the coefficient of friction of the circular gripping surfaces and the coefficient of friction of the sliding surface between the gripper pieces. In general practice, the distance E will not exceed 35% of the radius of the inner race. Thus, there is established a relationship between the coefficients of friction of the circular gripping surfaces and the sliding surfaces of the gripper pieces which is permitted in the design of the gripper means.

It should be pointed out that the sliding surfaces of the gripper means need not be arcs of circles and could, for example, be portions of a spiral laid out to a base circle of radius E.

In connection with the theory set forth above, it can further be shown that if the surfaces of the gripper which engage the circular surfaces of the outer and inner races are contoured as illustrated in FIG. 4, advantages are realized in the performance of the one-way clutch. Turning to FIG. 4, it is seen there in cross-section how the gripper pieces 18 and 19 making up a gripper member 15 may be contoured to form wedges or keels 33 and 35 which fit in and essentially correspond to grooves 32 and 34 in the outer and inner races, respectively. In such a design, the angles $\theta_W$ and $\theta_V$ enter into the calculation of $\alpha$ and hence in the design of the gripper means used. It can be shown that if the gripper and corresponding surfaces of the races are contoured in this manner, then Equations 7 and 8 must be modified to read $$\alpha + \phi_0 < \frac{\phi_I}{\sin \theta_W} \quad (9)$$

and $$\alpha + \phi_0 \frac{\phi_K}{\sin \theta_V} \quad (10)$$

Since $\sin \theta$ is always less than one, it follows that a gripper formed in accordance with the modification of FIG. 4, in addition to allowing a greater degree of eccentricity which in turn leads to lower stresses through the clutch, makes the requirement for low coefficients of friction at the gripper sliding surfaces less stringent than in the embodiment illustrated in FIG. 5, to be described. Moreover, the design in FIG. 4 of the races and gripper means permits engagement during axial movement with respect to the inner race more readily than in the case of FIG. 5. As will be described below in connection with FIGS. 6–12, the use of a keel and a groove on the circular gripping surfaces means may entirely eliminate the requirement for a differential in coefficient of friction of the various surfaces involved.

Although the angles $\theta_W$ and $\theta_V$ may be equal, I have found that in some cases there is an advantage in making $\theta_V$ slightly larger than $\theta_W$. As will be apparent in the description of FIGS. 6–10, it is possible to use a number of modifications of the groove and keel arrangement to obtain the high frictional forces required at the circular gripping surfaces.

As noted above, the locking of the one-way clutch of this invention depends upon the development of higher static frictional forces at the circular gripping surfaces between the gripping means and the races than is developed at the sliding surface between the gripper pieces making up a single gripper member. The modification of the clutch shown in FIG. 3 achieves this differential of friction at the circular surfaces through the use of design, i.e., through the use of keels and grooves, However, the difference in frictional forces may also be attained through construction, that is, by the use of different materials at the surfaces which possess different relative coefficients of friction. Such a modification is illustrated in a much-enlarged cross-sectional view in FIG. 5. This figure illustrates the use of materials to line the various surfaces to develop the required coefficients of friction. Thus, if desired the sliding surfaces 21 may be two layers 36 and 37 permanently affixed to gripper pieces 18 and 19. As an example, the sliding surfaces of the gripper pieces may be formed of layers of a synthetic resin such as polytetrafluoroethylene (Teflon), which is known to possess a low coefficient of friction. One of these sliding surfaces, i.e., either 36 or 37 could be of another resin material, such as for example an epoxy resin. As an example, the coefficient of friction which exists between Teflon and an epoxy resin is of the order of 0.04. The surfaces 11 and 12 may be steel on steel. It may however be desirable in order to develop higher frictional forces to coat or otherwise deposit layers 38 and 40 on the circular surfaces of the gripper pieces 18 and 19. As an alternative to this, or in addition to it, the circular surfaces 11 and 13 of the outer and inner races, respectively, may have coated on them or embedded in them, layers of materials 39 and 41 to increase the coefficients of friction. Suitable coating or lining materials to increase friction are well-known and include leather, etc. It also illustrates the use of a thrust bearing 28 to maintain the gripper means on the inner race, and of a snap ring 29 suitable for holding the thrust bearing 28 in place.

Figure 6:
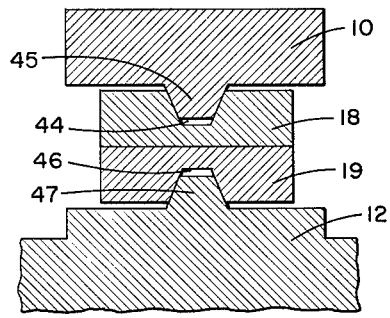
FIGS. 6–10 are cross-sectional detail views of various modifications of gripper and race configurations.

Modifications of the preferred form, i.e., design, of achieving the higher frictional forces at the circular gripping surfaces are illustarted in FIGS. 6–10, all of which show various ways in which the keel and groove configuration may be employed. In FIG. 6, the gripper pieces 18 and 19 have grooves 44 and 46 while the outer and inner races have corresponding keels 45 and 47. This, as will be seen, is an alternative arrangement to that shown in FIG. 4 wherein the grooves are in the races, and the keels in the gripper means. In some cases, the arrangement of FIG. 4 may be more desirable if the milling of grooves in the relatively narrow gripper means tends to detract from their overall strength.

Figure 7:
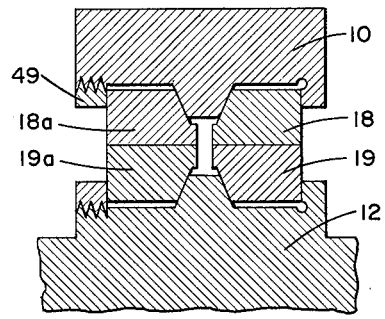

In FIG. 7, there is illustrated a modification of the arrangement in FIG. 6 wherein the gripper pieces are each formed in two parts, namely, 18 and 18a, and 19 and 19a, and two corresponding grooves are cut in each of the races. FIG. 7 also shows one way in which it may be desirable to assemble such an arrangement through the use of an annular ring 49 which is adapted to screw into the races during clutch assembly and maintain the gripper pieces in position.

Figure 8:
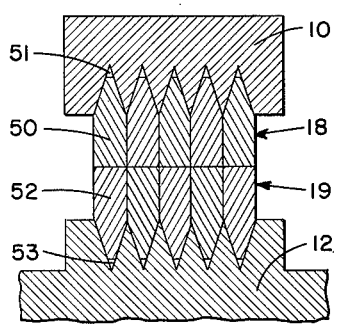

FIG. 8 illustrates how the gripper pieces 18 may be formed from a plurality of keels 50 and the outer race contain a corresponding plurality of grooves 51. In like manner, gripper piece 19 may be formed of a plurality of keels 52 and inner race 12 contain a corresponding plurality of grooves 53. It is of course within the scope of this invention to form one of the gripper pieces, as in FIG. 8, and the other as in FIG. 4, for example. The arrangement of FIG. 8 in which a plurality of keel members are used may be particularly well suited to the construction of a clutch in which it would not be desirable to cut deep grooves in the races or in the gripper means if such grooves were to detract from the overall strength of the component. Thus, the use of a plurality of keels and grooves allows using a larger surface contacting area without cutting deep grooves in the race or gripper. Of course, the arrangement shown in FIG. 8 may be reversed, that is, the grooves may be put in the gripper means and the keels may form a part of the races.

Figure 9:
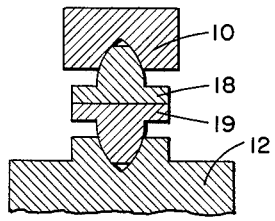
Figure 10:
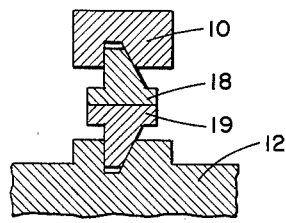

FIGS. 9 and 10 illustrate two other configurations which the keels and grooves of the gripper means and races may assume and show that the surfaces of the keels and the grooves need not be truly V-shaped, but may be slightly rounded (FIG. 9) or unsymmetrical (FIG. 10). As in the case of FIG. 8, these may also be reversed, that is, the grooves may be put in the gripper members.

Figure 11:
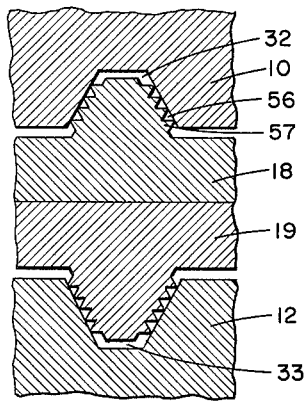
FIGS. 11–12 are cross-sectional detail views illustrating the use of oil grooves between the contacting surfaces of the gripper means and the races.
Figure 12:
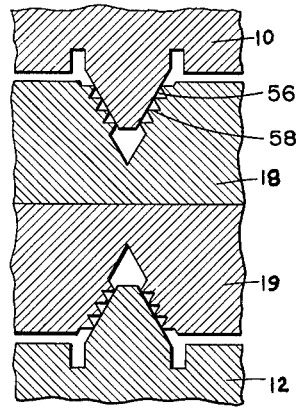

FIGS. 11 and 12 illustrate the use of an oil channel 56 which may be desirable for allowing oil to escape during loading, promoting oil circulation during free wheeling, and providing a safe place for dirt to lodge.

FIG. 11 is a detailed drawing of a portion of the cross-sectional view of FIG. 3. In this modification, the contacting edges of the keel portions of the gripper pieces 18 and 19 are serrated or otherwise given channels 56 which permit the passage of oil or lubricants therethrough.

In this modification the lands 57 of the surface of the gripper pieces 18 and 19 make contact with the surface of the grooves 32 and 33 of the outer and inner races, respectively. In a similar manner, the modification in FIG. 12 is a detailed drawing of a portion of a clutch similar to that in FIG. 6. In this arrangement, the oil channels 56 are in the surface of the gripper pieces and the lands 58 of this surface contact the surfaces of the keels in the races, leaving the channels 56 for oil passage. Thus, it may be seen that the serrations may be placed on the surface of the grooves or on the surface of the keels whether the grooves are in the races or in the gripping means.

In the operation of a one-way clutch of this invention there will, in most cases, be a film of oil at the contacting surfaces and this means that the engagements of the surfaces will be made through this oil film. Moreover, it will be seen that the clutch overruns when the outer race rotates without building up centrifugal pressures between a race and gripper such as occurs in prior art one-way clutches. The operation of the clutch of this invention, without the building up of any appreciable pressures means that there is less heat developed, which in turn results in increased efficiency and less wear of the clutch parts. Moreover, it will be seen that this clutch provides centrifugal disengagement where useful, and at the same time reduces the possibility of slippage due to axial motion of the races. The clutch is designed to have the proper relationship between the properties of the materials used on the engaging surfaces; and in the case of the design in FIGS. 2–4 and 6–12 the stresses are reduced still further and the frictional properties required in the engaging surfaces are less drastic. Finally, it will be seen from the description of this clutch that it is capable of acting as a bearing during overrunning if the grippers are properly restricted, and that it has little stored energy.

From the above description and drawings it will be seen that there is provided a one-way clutch which, by the use of a novel design and/or construction and the employment of gripping areas, is capable of bearing large loads efficiently.

It will be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

I claim:
1. A one-way clutch, comprising in combination
(a) an inner race having a unitary outer circular surface;
(b) an outer race having a unitary inner circular surface concentric with said circular surface of said inner race and defining with it an annular space;
(c) gripper means occupying substantially all of said space and having circular surfaces adapted for area-to-area contact with said circular surfaces of said races thereby to form circular gripping surfaces with said races, said gripper means comprising a plurality of members each of which comprises complementary wedge-shaped pieces which are in area-to-area contact and form between them sliding surfaces;
(d) engaging means adapted to maintain said gripper means in contact with said races; said circular gripping surfaces between said races and said gripper means contoured to provide at least one groove in said circular surfaces of said gripper means and at least one keel on the corresponding circular mating surfaces of said races adapted to fit said groove in said gripper means,
whereby said circular surfaces develop greater frictional forces than said surfaces between said pieces forming said gripper members.

2. A one-way clutch, comprising in combination
(a) an inner race having a unitary outer circular surface;
(b) an outer race having a unitary inner circular surface concentric with said circular surface of said inner race and defining with it an annular space;
(c) gripper means occupying substantially all of said space and having circular surfaces adapted for area-to-area contact with said circular surfaces of said races thereby to form circular gripping surfaces with said races, said gripper means comprising a plurality of members each of which comprises complementary wedge-shaped pieces which are in area-to-area contact and form between them sliding surfaces, those of said gripper pieces contacting said inner surface of said outer race having at their narrow end an extension adapted to retain said engaging means in position; and
(d) engaging means adapted to maintain said gripper means in contact with said races;
said circular gripping surfaces between said races and said gripping means being contoured to provide at least one groove in one surface and at least one keel adapted to fit said groove in the corresponding mating surface, whereby said circular surfaces develop greater frictional forces than said surfaces between said pieces forming said gripper members.

3. A one-way clutch in accordance with claim 2 wherein said engaging means are springs.

References Cited by the Examiner

UNITED STATES PATENTS

| | | | |
|---|---|---|---|
| 362,084 | 5/1887 | Hubbard | 192—41 |
| 1,453,548 | 5/1923 | Duncombe | 192—41 |
| 2,013,413 | 9/1935 | Lazzarinia | 192—43 |
| 2,297,166 | 9/1942 | Rohin et al. | 192—45.1 |

FOREIGN PATENTS

| | | |
|---|---|---|
| 837,440 | 2/1939 | France. |
| 881,459 | 1/1943 | France. |
| 1,088,396 | 9/1954 | France. |

DAVID J. WILLIAMOWSKY, *Primary Examiner.*